Figure 1:
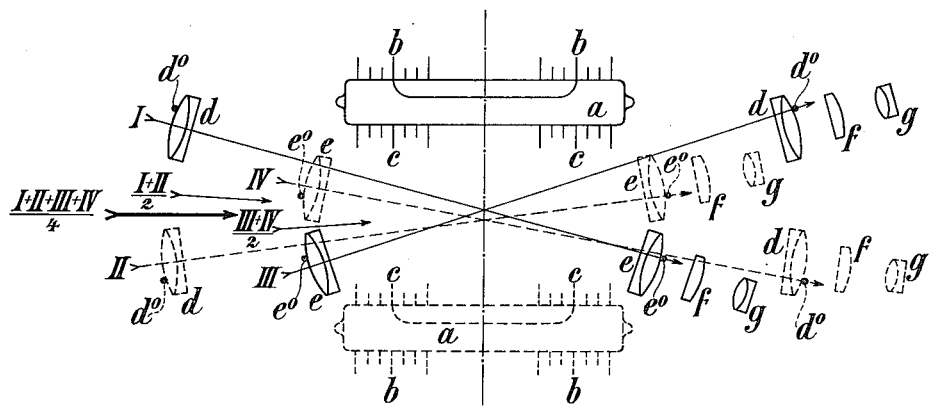

H. WILD.
LEVELING INSTRUMENT.
APPLICATION FILED AUG. 2, 1910.

1,160,228.

Patented Nov. 16, 1915.

Witnesses:
Paul Krüger
Richard Hahn

Inventor:
Heinrich Wild

UNITED STATES PATENT OFFICE.

HEINRICH WILD, OF JENA, GERMANY, ASSIGNOR TO THE FIRM OF CARL ZEISS, OF JENA, GERMANY.

LEVELING INSTRUMENT.

1,160,228.  Specification of Letters Patent.  Patented Nov. 16, 1915.

Application filed August 2, 1910. Serial No. 575,191.

*To all whom it may concern:*

Be it known that I, HEINRICH WILD, a citizen of the German Empire, residing at Carl-Zeiss strasse, Jena, in the Grand Duchy of Saxe-Weimar, Germany, have invented a new and useful Leveling Instrument, of which the following is a specification.

The invention relates to leveling instruments, in which a telescope with a spirit level fixed to it is journaled so as to be rotatable on the axis of the telescope through 180° (whereby telescope and spirit level are "reversed"), and in which, so as to be able to adjust the instrument in a simple manner with the elimination of the spirit level error, the spirit level can be used also in the opposite direction. Instruments of this type have been constructed hitherto in two different ways, either that the spirit level can be unscrewed from the telescope and screwed on again after changing it end for end or that it can be turned by 180° about a vertical axis. In both cases the approximate adjustment of the instrument is lost, the restoring of which entails a great loss of time.

According to the present invention the spirit level can be used in the opposite direction, without giving it a different position relative to the telescope, if the sighting telescope itself is so constructed that it can be used in the opposite direction. Such an arrangement was used by Le Cyre with the sighting telescopes of a range finder and is described on page 250 and shown on Plate XVI of "*Des instruments pour la mesure des distances*" by J. de Marre, (Paris 1880). Le Cyre fitted at the ends of a tube two mark plates and within it two equal objectives, each at a very small distance from a mark plate and of such focal length, that its principal focal plane passes through the mark which is adjacent to the other objective. Two lines of sight of approximately opposite direction then result, each determined by the optical center of an objective and the mark in its principal focal plane. An equivalent arrangement is obtained, when both objectives are given the same focal length and the marks are fixed directly on the objectives. A mixed form of the two arrangements can also be employed. An eye piece was hinged to either end of the tube by Le Cyre. Instead of this a single eye piece, adapted to be placed on either end of the tube, can also be used.

In order to render a sighting telescope of this description capable of being focused for use as a leveling telescope, it is sufficient to make one objective shiftable. But the same result will be obtained, if—similarly as in the common leveling telescope a special focusing lens is provided between objective and mark plate—a negative or positive, shiftable lens be provided between the two objectives.

Figure 2:
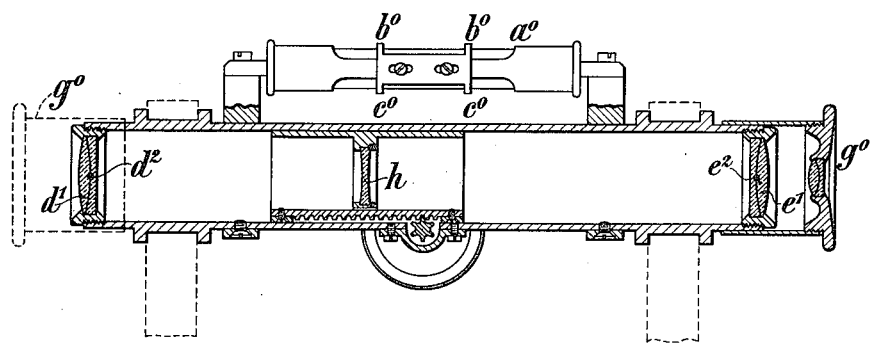

In the annexed drawing: Figure 1 is a diagrammatic representation of an instrument according to the invention, showing its manipulation. Fig. 2 is an elevation, partly in section, of a leveling telescope according to the invention.

In Fig. 1 the spirit level $a$ is represented with its scales $b\ b$ and $c\ c$ first (with the bubble in the zero position before reversing) by full lines, and a second time (after reversing with the bubble again brought into the zero position) by dotted lines. The two corresponding positions of the sighting telescope are indicated by I and II, which may be taken to represent the values read on the staff. In both the objective $d$ projects the image of the staff in the field of the mark $e^0$ of the objective $e$. The lenses $f$ and $g$ represent the eye piece. The mean $$\frac{I+II}{2}$$

of the two readings is, as is well-known, independent of the position of the spirit level relative to the line of sight and is too small or too great by only the half of the spirit level error, if by spirit level error is understood the error in the reading, which corresponds to the relative inclination of the two axes, which pertain, before and after reversing, to the spirit level with its bubble brought into the zero position. According as this angle may be open or closed toward the eye piece, the spirit level error has a positive or a negative sign and the mean of the two readings I and II is too great or too small. If therefore by changing the spirit level end for end the spirit level error is caused to change its sign and a second pair of readings is then carried out, the mean $$\frac{III+IV}{2}$$

of these two has the same but opposite error to the first mean $$\frac{I+II}{2}.$$

The correct reading is gained from the mean of the two means $$\frac{I+II+III+IV}{4}.$$

In the case of the arrangement according to the invention the second pair of readings is arrived at, by fitting the eye piece $f$ $g$ to the other end of the telescope and rotating the telescope in the azimuth by 180°, so that now the objective $e$ projects the image of the staff in the field of the mark $d^0$.

In Fig. 1 the position of the new sighting telescope before and after reversing is also represented, while the third and fourth positions of the spirit level $a$ do not visibly differ from the first and second positions on account of the symmetrical form of the spirit level, and on account of the position assumed for the axis of azimuthal rotation in the plane of symmetry of the spirit level.

The adjustment on the basis of the correct reading $$\frac{I+II+III+IV}{4}$$

can be carried out in various ways. The simplest is to give to the reading I the value of the correct reading by manipulating the tilting screw of the telescope and then to bring the level bubble into zero position by shifting the scale $b$ $b$. But then only reading I may be worked with. Should it be requisite for specially accurate measurements to make use of the reversion, i. e. to always take readings I and II, in order to form the mean therefrom, then the mean value $$\frac{I+II}{2}$$

must, by shifting the scale $b$ $b$ or the scale $c$ $c$ or both, be made equal to the correct reading. The spirit level error has then become zero: the spirit level axes lie parallel to each other.

In Fig. 2 the spirit level $a^0$ is fitted instead of with two scales with two pairs of marks $b^0$ $b^0$ and $c^0$ $c^0$, which are rigidly joined together and may be adjusted by the screws $a^1$, which secure them to the spirit level casing, being slackened, the piece carrying the pairs of marks shifted in the direction of the spirit level axis and the screws tightened again. The eye piece $g^0$ can be slid onto either end of the telescope, as the case may be. The two objectives $d^1$ and $e^1$ are at the same time the carriers of the marks $d^2$ and $e^2$. A dispersive lens $h$, which is made shiftable in the usual way, serves for the focusing.

The instrument is journaled in a support $i$ and can be set in the vertical plane, being hinged to a base $k$ and further connected with this base by a tilting screw $l$.

I claim:

In a leveling instrument the combination with a sighting telescope, of a spirit level fixed to the telescope, and a support, in which the telescope is journaled, so as to be rotatable on its axis through 180°, the telescope having an objective at either end, a mark at either end in the focus of the objective placed at the other end, and optical means for observing either mark together with the image projected by the objective placed at the other end.

HEINRICH WILD.

Witnesses:
  PAUL KRÜGER,
  ALFRED MACKEDANZ.